United States Patent [19]

Hanada

[11] Patent Number: 5,453,602
[45] Date of Patent: Sep. 26, 1995

[54] METHOD OF READING ELECTRICAL INFORMATION AND INFORMATION CARRYING MEMBER FOR USE IN THE METHOD

[75] Inventor: Koji Hanada, Tokyo, Japan

[73] Assignee: Toyo Ink Manufacturing Co., Ltd., Tokyo, Japan

[21] Appl. No.: 937,451

[22] Filed: Aug. 31, 1992

Related U.S. Application Data

[63] Continuation of Ser. No. 575,655, Aug. 30, 1990, abandoned.

[30] Foreign Application Priority Data

Sep. 1, 1989 [JP] Japan .................... 1-224639

[51] Int. Cl.⁶ ............................................. G06K 7/00
[52] U.S. Cl. ............................. 235/439; 235/449
[58] Field of Search .................... 235/439, 435, 235/444, 449, 451, 492, 493; 369/126

[56] References Cited

U.S. PATENT DOCUMENTS

| | | | |
|---|---|---|---|
| 2,726,289 | 12/1955 | Evans | 369/4 |
| 3,519,802 | 7/1970 | Cinque et al. | 235/451 |
| 3,562,496 | 2/1971 | Fisher | 235/439 |
| 3,598,968 | 8/1971 | Victor | 235/439 |
| 3,699,311 | 10/1972 | Dunbar | 235/451 X |
| 3,831,008 | 8/1974 | Bradshaw | 235/61.11 |
| 3,936,662 | 2/1976 | Rausing | 235/439 |
| 4,029,945 | 6/1977 | Yamada et al. | 235/439 X |
| 4,097,728 | 6/1978 | Genest et al. | 235/439 |
| 4,146,781 | 3/1979 | Machate | 235/439 |
| 4,355,300 | 10/1982 | Weber | 235/451 |
| 5,041,721 | 8/1991 | Smith et al. | 235/462 |

FOREIGN PATENT DOCUMENTS

| | | | |
|---|---|---|---|
| 0133656 | 3/1985 | European Pat. Off. | 235/451 |
| 0177900 | 4/1986 | European Pat. Off. | |
| 0260940 | 3/1988 | European Pat. Off. | |
| 202352 | 9/1983 | Germany. | |
| 256204 | 4/1988 | Germany. | |
| 62-40587 | 2/1987 | Japan | 235/451 |
| 2081949 | 2/1982 | United Kingdom. | |

Primary Examiner—Donald Hajec
Assistant Examiner—Karl D. Frech
Attorney, Agent, or Firm—Wenderoth, Lind & Ponack

[57] ABSTRACT

A method of reading electrical information, which comprises arranging electric field-generating means having a pulse oscillator and detection means of detecting a potential in the electric field to form an electrostatic coupling space and/or a latent electrostatic coupling space where the and the detection means can sense a change in the electric field as a change of potential passing an information carrying member formed by covering an electrically conductive member having a form expressing information with an electrically nonconductive material through the electrostatic coupling space or the latent electrostatic coupling space, thereby to detect the information expressed by the form of the electrically conductive member, and information carrying member for use in the method.

7 Claims, 8 Drawing Sheets

METHOD OF READING ELECTRICAL INFORMATION AND INFORMATION CARRYING MEMBER FOR USE IN THE METHOD

This application is a continuation of now abandoned application, Ser. No. 07/575,655 filed on Aug. 30, 1990.

FIELD OF THE INVENTION

This invention relates to a method of reading electrical information carrying which comprises passing an information member, which is formed by covering an electrically conductive member having a form expressing information with an electrically nonconductive material, through an electrostatic coupling space and/or a latent electrostatic coupling space and detecting the form of the electrically conductive member, and an information carrying member for use in the method.

DESCRIPTION OF RELATED ART

For a debit card, a credit card, a bank card, an I.D. card, a driver's license, a ticket, an admission ticket, a membership card, a card for securities, certificates, and the like, a variety of proposals have been made hitherto in order to improve the means of preventing alteration and falsification thereof, to improve means of recording and reading them for identification or to improve the resistance of the stored information from damage. These proposals are directed to a single use or combined use of means of processing a paper or plastic substrate surface such as a printing, engraving, embossing, laser, discharging, laminating or vapor deposition means, a functional material such as a magnetic, electrically conductive, photosensitive, heat-sensitive, foaming or light-emitting material and a detecting means which works depending upon function.

In the recordal of information for identification, it is general practice to compare a visible information such as a name, a date of birth, a signature, a card number or a photograph of a face with a written invisible information, a signature written in the presence of a comparer or a face. A magnetic recording method has been heretofore widely used as a simplest means of writing invisible information.

However, magnetically written information has a risk of being erased by an external high magnetic field. Further, since the magnetic recording method has become popular in recent years, there is a risk of magnetically written information being copied, altered or falsified. In order to prevent such risks, various proposals have been made, such as increasing of the coercive force of a magnetic film per se, patterning of an information-recorded portion, changing of a decoding rule, and the like. However, the magnetic recording method involves a risk of abuse due to its inherent possibility that information can be rewritten without destructing an information-written card, etc.

There is another proposal for a method for storing invisible information, in which an integrated chip (IC) is embedded in the card and information is written in the IC memory. However, this method is expensive, and its use is hence limited.

Further, information to be provided to a card, a certificate, etc., is classified into constant information and individual information. The constant information means information which is replicated in a large amount by processing means typified, e.g. by printing, and examples of the constant information include a picture, a pattern, a mark, bar code source masking, etc. The individual information means that which is formed by providing an individual recording medium with a separate information, e.g., by an embossing, magnetic-recording, or printing method. Examples thereof include embossed letters, coating or numbering on a magnetic film, and the like.

It is only a magnetic recording method that is substantially available for automatizable and less expensive means of writing invisible and individual information. However, this method has a large risk of being altered and falsified.

As a substitute means for the magnetic recording method, JP,A 49-60835, corresponding to U.S. Pat. No. 3,699,311, discloses a method using a combination of a card having encoded information bits with a decoder. In this combination, the decoder has a transmitter plate and a detector plate, and other plate is provided inside the card so as to form a condenser together with the transmitter plate and the detector plate. And, the presence or absence of information bits is determined depending upon connection or disconnection between the plates. In this method, the number of information bits or the location of information is fixed, and a form of information cannot always be determined. In particular, it is impossible to detect information which is formed depending upon a length, area or form of the plate, and the amount of information stored in the card is limited.

SUMMARY OF THE INVENTION

It is an object of this invention to provide a method of reading electrical information, which can provide, at a low cost and with ease, invisible and individual information having a large volume of data and being almost free from a risk of alteration and falsification, and which can be easily automatized, and an information carrying member for use in the method.

It is another object of this invention to provide a method of reading electrical information, for which an electrically conductive member having high strength against an environmental change and having a form expressing information can be easily formed, and an information member for use in the method.

It is further another object of this invention to provide a method of reading electrical information, which permits reading electrical individual information at a real time, and an information carrying member for use in the method.

Further, it is another object of this invention to provide a method of reading electrical information, which is capable of reading two-dimensional information by only unidimensionally moving an information member having the two-dimensional information or by fixing the information member, and an information member for use in the method.

The "electrically conductive member having a form expressing information" in this invention means an electrically conductive member formed into, for example, a pattern, etc., of a plurality of bars, etc.

According to this invention, there is provided a method of reading electrical information, which comprises arranging electric field-generating means having a pulse oscillator and detection means of detecting a potential in the electric field to form an electrostatic coupling space and/or a latent electrostatic coupling space where the electric field-generating means and the detection means mutually interfere with each other due to electrostatic coupling, and passing an information member formed by covering an electrically conductive member having a form expressive information with an electrically nonconductive material through the electrostatic coupling space or the latent electrostatic coupling space, thereby to detect the information according to the form of the electrically conductive member.

Further, according to this invention, there is provided an information carrying member for use in the above method, which is formed by covering an electrically conductive member having a form expressing information with an electrically nonconductive material.

BRIEF DESCRIPTION OF THE DRAWINGS

FIGS. 13(I and II) and 14(I and II) are each a graph showing a waveform of a pulse obtained in the first method of reading information.

FIGS. 15(I and II) and 16(I and II) are each a graph showing a waveform of a pulse obtained in the second method of reading information.

FIGS. 17(I and II) and 18(I and II) are each a graph showing a waveform of a pulse obtained in the third method of reading information.

DETAILED DESCRIPTION OF THE INVENTION

The method of reading electrical information, provided by this invention, include the following three modes.

In the first method of a means of generating an electric field and means of detecting an electric potential are arranged to form an electrostatic coupling space, and an information carrying member is allowed to pass through the electrostatic coupling space to block a pulse from the means of generating an electric field by an electrostatic shielding effect, whereby information expressed by the form of the electrically conductive member of the information carrying member is detected.

In the second method a means of generating an electric field and means of detecting an electric potential are arranged to form an electrostatic coupling space and a latent electrostatic coupling space, and an information carrying member is allowed to pass through the latent electrostatic coupling space to block a pulse from the means of generating an electric field by an electrostatic shielding effect, whereby information expressed by the form of the electrically conductive member of the information carrying member is detected.

In the third method, a means of generating an electric field and means of detecting an electric potential are arranged to form a latent electrostatic coupling space, and an information carrying member is allowed to pass through the latent electrostatic coupling space to transmit an electric potential from the means of generating an electric field to the means of detecting an electric potential by an electrostatic induction effect, whereby information expressed by the form of the electrically conductive member of the information carrying member is detected.

In the above first method, it is necessary to substantially ground the electrically conductive member of the information carrying member through electrostatic coupling by providing at least one of the means of generating an electric field and the means of detecting an electric potential with a grounding plate in parallel with and contiguously to the information carrying member which is passing the electrostatic coupling space.

Figure 19:
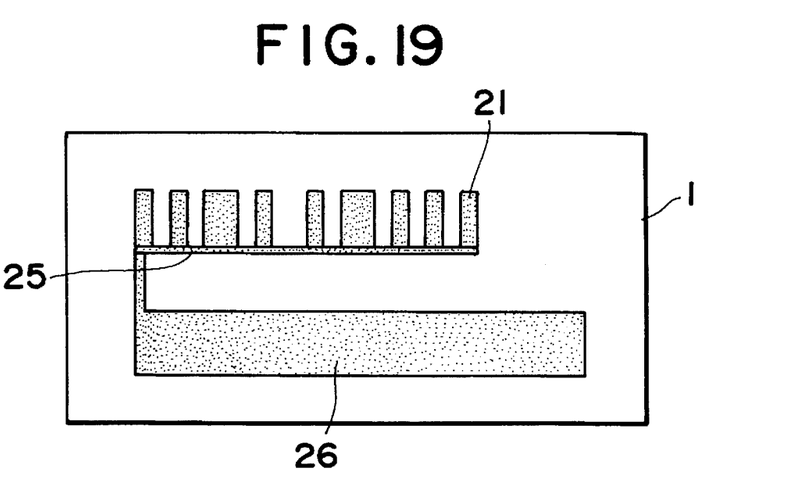
FIGS. 19 to 22 are each a plan view showing a form of an electrically conductive member used in the method of reading information, provided by this invention.

Further, in the above first method, it is preferable, in view of increasing detection sensitivity, to substantially ground the electrically conductive member by providing the information carrying member with a connection member formed of an electrically conductive material thereby to connect, e.g. bars of the electrically conductive member with the connection member, providing the information carrying member with an electrostatic coupling space-forming member, which forms an electrostatic coupling space together with the grounding plate, thereby to connect the connection member to the electrostatic coupling space-forming member, and electrostatically coupling the grounding plate with the electrostatic coupling space-forming member as shown in FIG. 19.

In the above first method, it is preferable, in view of increasing detection sensitivity for information identification, to provide at least one of the means of generating an electric field and the means of detecting an electric potential with a guard plate which prevents formation of an electrostatic coupling space other than the electrostatic coupling space for detection.

In the second method, it is preferable to provide a grounding plate in parallel with and contiguously to the electrically conductive member of the information carrying member in order to substantially ground the electrically conductive member easily.

In the second method, it is preferable, in view of increasing detection sensitivity, to provide at least one of the means of generating an electric field and the means of detecting an electric potential with a guard plate in order to prevent formation of an electrostatic coupling space other than the electrostatic coupling space for detection.

In the third method, it is preferable, in view of increasing detection sensitivity, to provide at least one of the means of generating an electric field and the means of detecting an electric potential with a guard plate in order to prevent formation of an electrostatic coupling space between the means of generating an electric field and the means of detecting an electric potential.

In the third method, the means of generating an electric field may be arranged toward one surface of the information carrying member, and the means of detecting an electric potential may be arranged toward the other surface of the information carrying member.

Examples of the electrically conductive member in this invention are an electrically conductive film, electrically conductive fibers, and the like.

This invention will be explained more specifically below by reference to drawings, in which an electrically conductive film in a various form is used as a typical example of the electrically conductive member.

Figure 1:
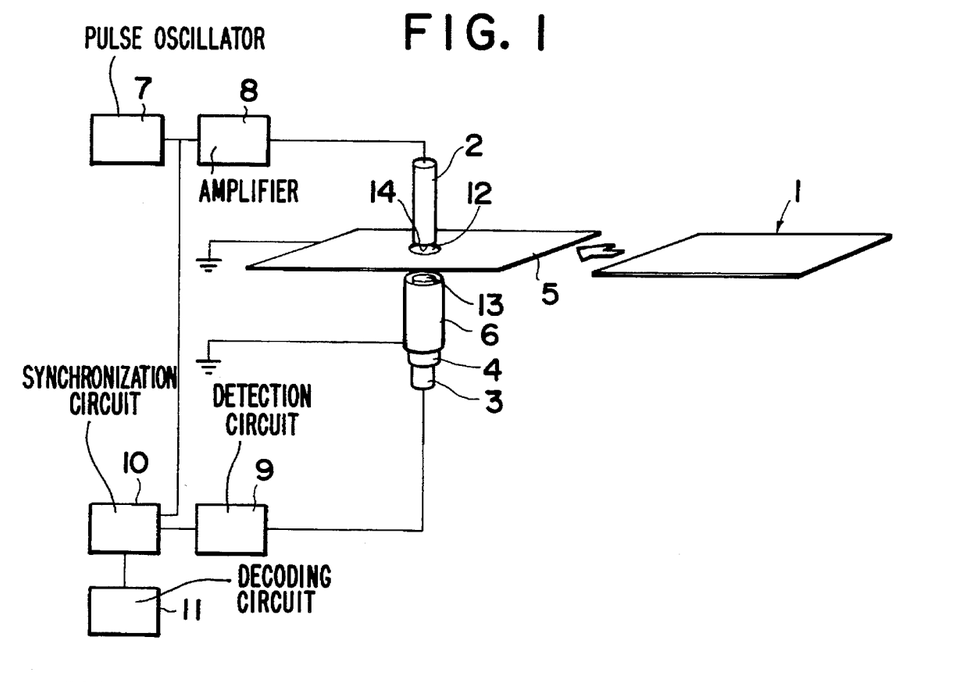
FIGS. 1 and 2 are each an illustrative diagram for an apparatus suitable for use in a first method of reading information.
Figure 2:
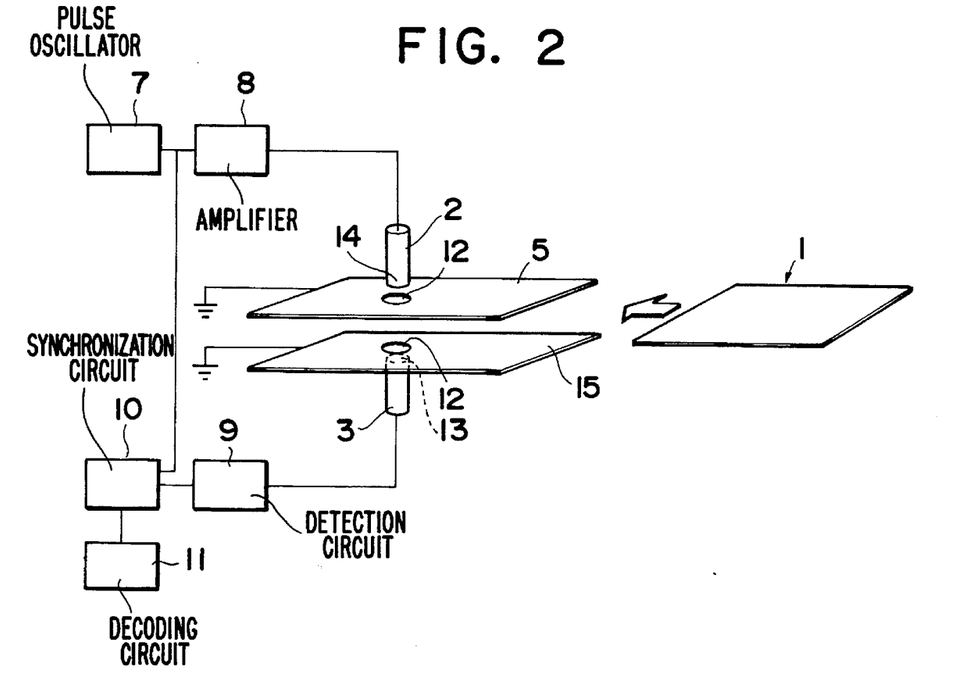

FIGS. 1 and 2 are block diagrams of an apparatus used for the first method of reading information, in which 1 indicates a card having a sandwich structure formed by covering a patterned electrically conductive film with an electrically nonconductive material, 7 indicates a pulse oscillator, 8 indicates an amplifier for amplification of a pulse from the pulse oscillator, 2 indicates a generator plate to generate an electric field according to the amplified pulse, 3 indicates a detector plate to detect the electric field, 9 indicates a circuit for detection of the potential of the detector plate 3 and filtering, 10 indicates a circuit for synchronization between the pulse from the oscillator 7 and the detected pulse and waveform shaping, and 11 indicates a circuit for decoding the detected and waveform-shaped pulse and outputting. Further, 5 is a grounding plate having a through hole 12. And, the generator plate 2 is disposed above the through hole 12, the detector plate 3 is disposed below the through hole 12, and these two plates are coaxially disposed such that they are electrically not in contact with the grounding plate 5. The positional relationship of these two plates may be changed. Numeral 6 is a guard plate to limit broadening of potential-detecting space for the detector plate to an end portion of the detector plate, and the guard plate is disposed such that it laterally covers the detector plate through an insulating layer 4. The grounding plate having the through hole can substantially work also as a guard plate, and it is therefore not necessarily required to provide the detector plate with the guard plate. When the detector plate or the generator plate is provided with a guard plate, the grounding plate 5 having a through hole is not necessarily required, and a grounding plate may be disposed on the lateral side of the card 1 along the moving direction of the card 1, whereby an electrically conductive film within the card can be reduced to a grounded potential due to electrostatic coupling. Due to electrostatic coupling, a mutual interference space is formed between an end surface 13 of the detector plate and an end surface 14 of the generator plate. The space between the end surfaces 13 and 14 is referred to as an electrostatic coupling space hereinafter.

FIG. 2 shows an embodiment where each of grounding plates 5 and 15 having a through hole 12 is disposed between two plates. A generator plate and a detector plate are disposed coaxially. End surfaces 13 and 14 of these two plates are not necessarily required to be disposed at the same levels as those of the grounding plates 5 and 15.

FIGS. 3 to 7 each explain an apparatus used for the second method of reading information.

Figure 3:
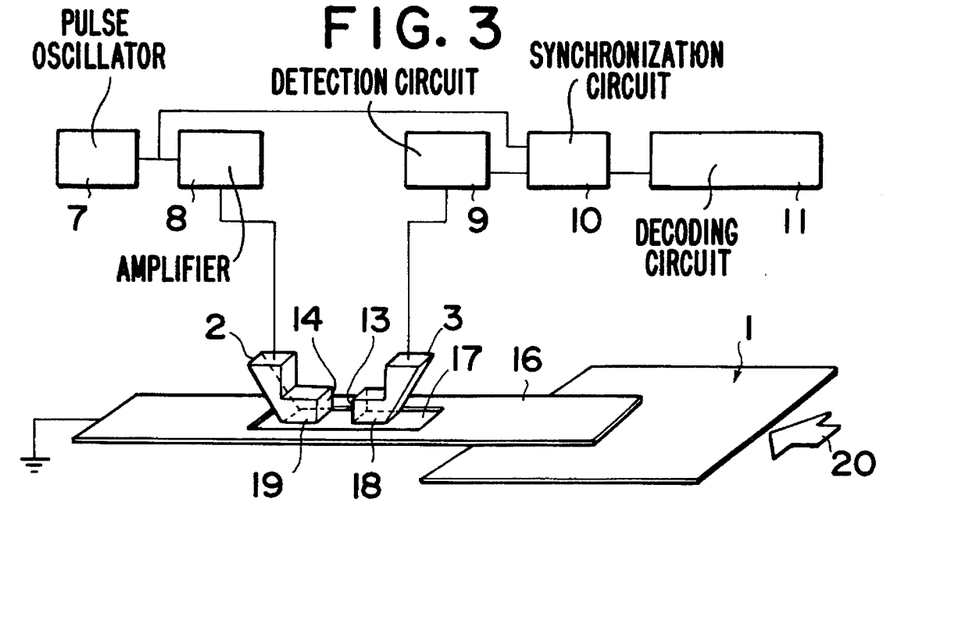
FIGS. 3, 6 and 7 are each an illustrative diagram for an apparatus suitable for use in a second method of reading information.

In FIG. 3, 16 indicates a grounding plate having a hole 17 below a generator plate 2 and a detector plate 3 which are disposed in parallel with an electrically conductive film of a card. The generator plate 2 has end surfaces 14 and 19, and the detector plate 3 has end surfaces 13 and 18. The end surface 14 and 13 are formed to be nearly in parallel with each other, and the end surfaces 19 and 18 are formed to be nearly at right angles with the end surfaces 14 and 13 and nearly at the same level. Numeral 20 indicates a moving direction of the card.

Figure 4:
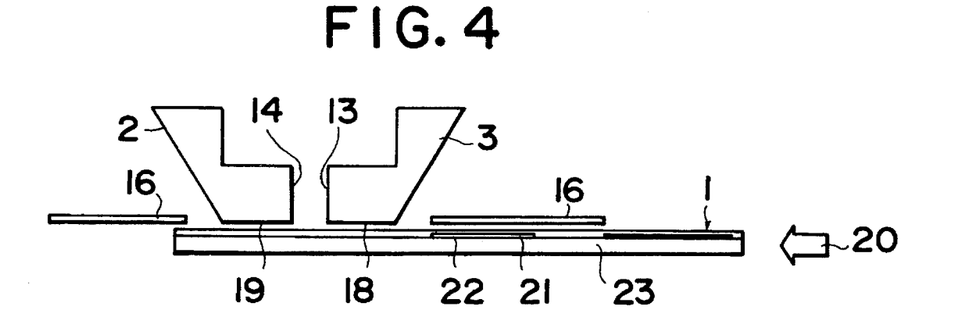
FIGS. 4 and 5 are each a cross sectional view to explain a function of the apparatus shown in FIG. 3.
Figure 5:
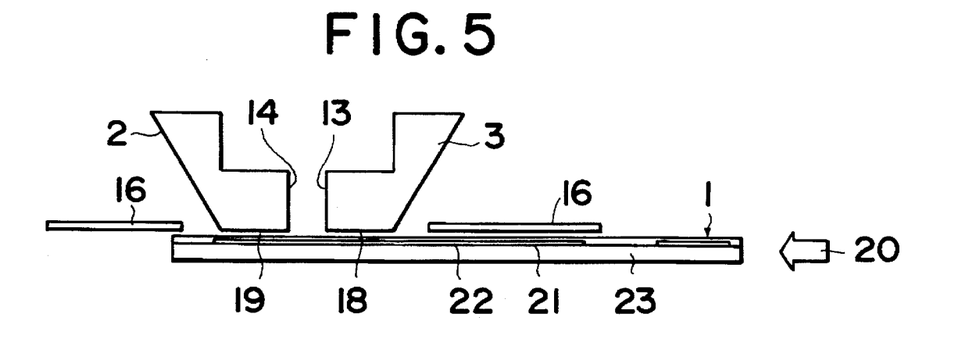

FIGS. 4 and 5 schematically show functions of an apparatus shown in FIG. 3.

FIG. 4 shows an embodiment where an electrically conductive film 21 is not positioned below the end surfaces 19 and 18 of the above plates 2 and 3. Numerals 22 and 23 indicate an electrically nonconductive film covering the electrically conductive film 21. In this state, the end surface 19 of the generator plate 2 and the end surface 18 of the detector plate 3 are electrostatically coupled.

FIG. 5 shows an embodiment where the electrically conductive film 21 is positioned below the end surfaces 19 and 18 of the above plates 2 and 3. Since a grounding plate 16 and the electrically conductive film 21 are electrostatically coupled with each other, the electrically conductive film 21 is reduced substantially to a grounded potential. Due to the presence of the electrically conductive film 21 having a grounded potential, the end surfaces 19 and 18 of the above plates are electrostatically coupled with each other through the electrically conductive film 21. As a result, the potentials of these two plates are reduced nearly to a grounded one, and the electrostatic coupling between the end surfaces 14 and 13 of these two plates is electrostatically reduced and changed to an electrostatically shielded state. For this reason, a space formed by the end surfaces 19 and 18 is referred to as a latent electrostatic coupling space in the present invention.

Figure 6:
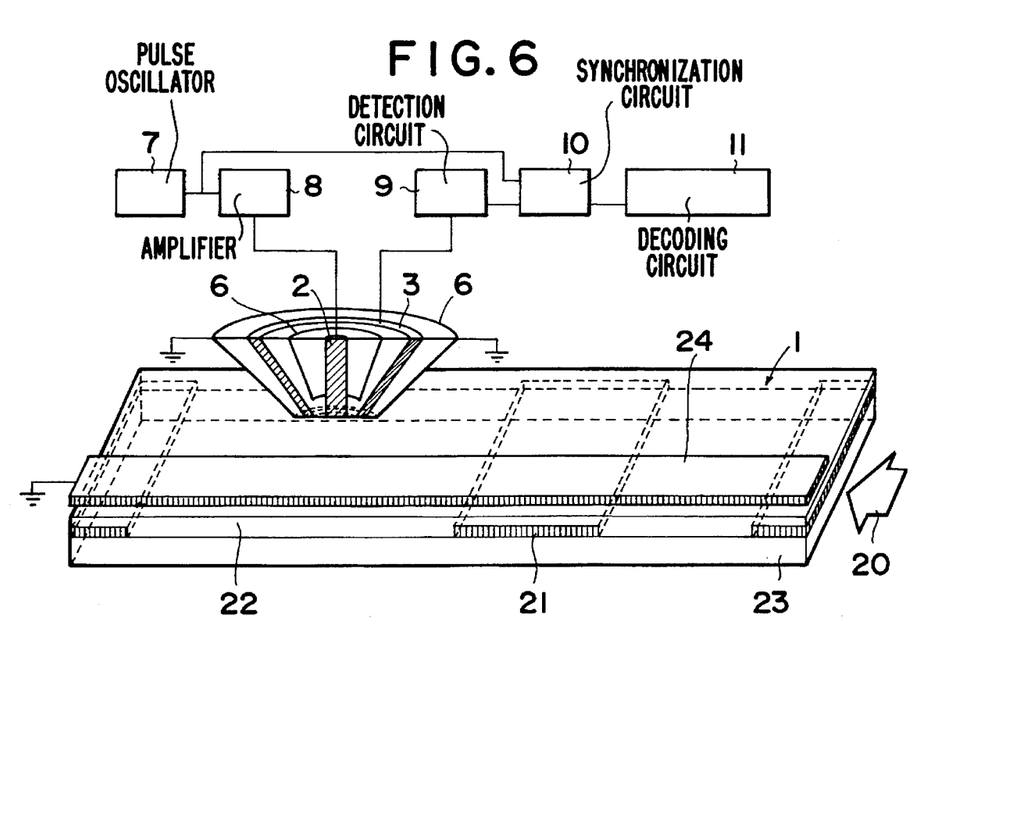

FIG. 6 is a schematic view of an apparatus including a partial cross sectional view of one embodiment in which a generator plate 2, a detector plate 3 and a guard plate 6 to control the position of the electrostatic coupling space formed by these generator and detector plates are concentrically arranged. This arrangement of the plates 2 and 3 and the guard plate 6 makes it possible to remove directional dependency of detection sensitivity. In this embodiment, it is necessary to dispose a grounding plate 24 such that it is never arranged within the electrostatic coupling space and the latent electrostatic coupling space.

Figure 7:
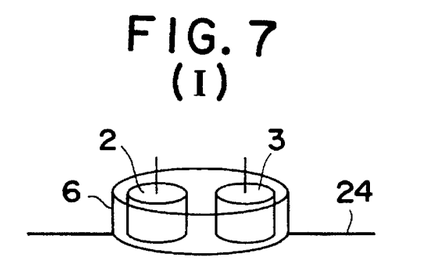

FIG. 7 shows an embodiment where a guard plate 6 is cylindrically arranged around a cylindrical generator plate 2 and a cylindrical detector plate 3, and a grounding plate 24 is connected to the guard plate 6. FIG. 7(I) is a schematic perspective view of such an arrangement, and FIG. 7(II) is a cross sectional view of the arrangement. A latent electrostatic coupling space is formed below the generator plate and the detector plate.

FIGS. 8 to 12 each explain an apparatus for use in the third method of reading information.

Figure 8:
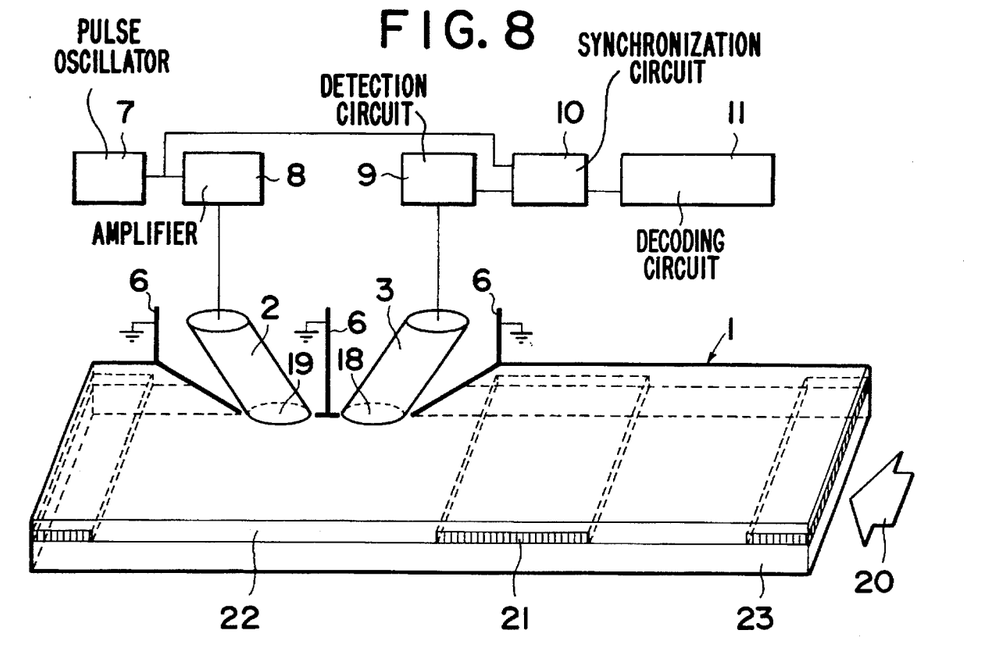
FIGS. 8, 10 and 11 are each a schematic illustration of an apparatus suitable for use in a third method of reading information.

In FIG. 8, numeral 6 indicates a guard plate to prevent formation of an electrostatic coupling space other than a space formed by end surfaces 19 and 18 of a generator plate 2 and a detector plate 3. The plates 2 and 3 are disposed such that they are electrically not in contact with each other. In FIG. 8, each of the two plates is provided with a guard plate. However, two guard plates are not always required.

The end surfaces 19 and 18 of the above two plates are not necessarily required to be at the same level. However, when the distance from an electrically conductive film to be detected is smaller and when an effective area formed by the end surfaces and the electrically conductive film is larger, a higher detection sensitivity can be achieved. The end surfaces 19 and 18 are disposed such that a latent electrostatic coupling space between the two plates is limited to a space below the end surfaces 19 and 18 of the plates and that the end surfaces 19 and 18 are not substantially electrostatically coupled with each other.

When widths of a bar code are read, a card is moved at right angles with bars. When the electrically conductive film has a form indicating two-dimensional information, the information can be identified by moving a card in X and Y directions. A reading (decoding) portion may be moved relative to the card in order to read the information.

Figure 9:
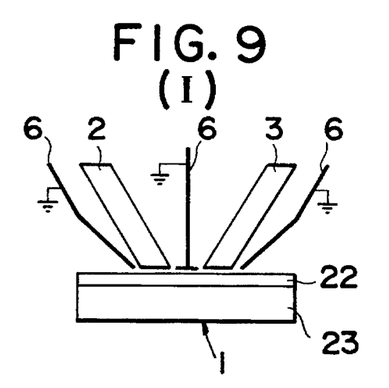
FIG. 9 is a schematic partial cross sectional view of the apparatus shown in FIG. 8.

FIG. 9 is a schematic cross sectional of an apparatus shown in FIG. 8 to explain the function thereof. FIG. 9(I) shows an embodiment where an electrically conductive film 21 is not positioned below end portions of the two plates 2 and 3. Numerals 22 and 23 each indicate an electrically nonconductive film covering the electrically conductive film 21. In this state, the generator plate 2 and the detector plate 3 are not substantially electrostatically coupled. However, a latent electrostatic coupling space is formed below the generator plate 2 and the detector plate 3. FIG. 9(II) shows an embodiment where the electrically conductive film 21 is positioned below the above two plates 2 and 3, i.e. within the latent electrostatic coupling space. In this state, the generator plate 2 and the electrically conductive film 21 are electrostatically coupled, and the electrically conductive film 21 and the detector plate 3 are electrostatically coupled. As a result, a pulse provided to the generator plate 2 is detected by the detector plate 3 through the electrically conductive film 21. Therefore, a size of the electrically conductive film is determined on the basis of a product of a detection time and speed, and a distance where no detection is effected is also determined as a piece of information.

Figure 10:
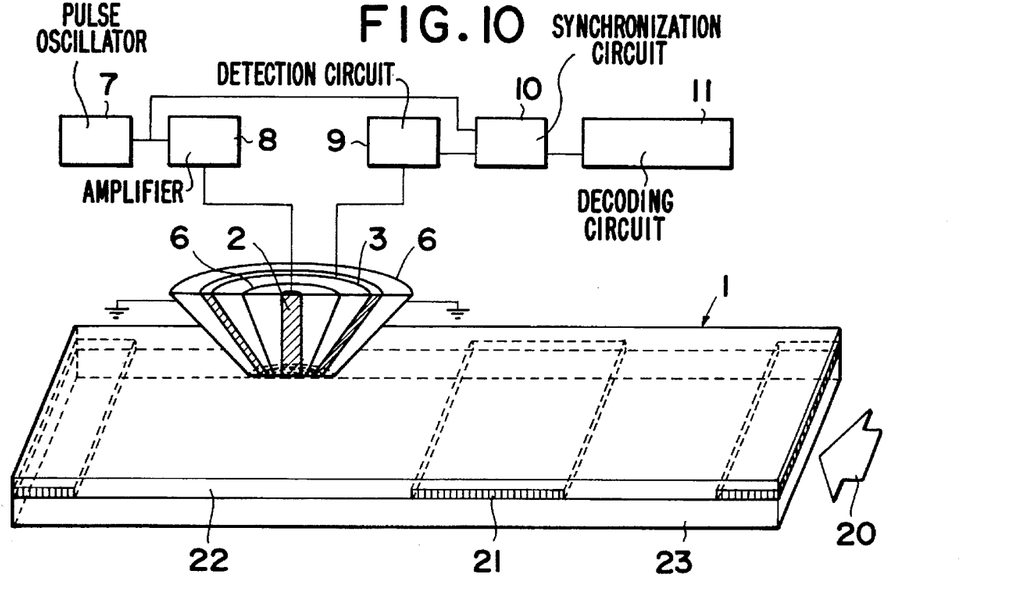

FIG. 10 shows an embodiment where a generator plate 2 and a detector plate 3 are concentrically arranged, one guard plate 6 is arranged between the generator plate 2 and the detector plate 3 and the other guard plate outside the detector plate 3 arranged outside. Due to such an arrangement of the guard plates, the latent electrostatic coupling space is limited to the information member direction. This arrangement of a reading portion makes it possible to decrease directional dependency of detection sensitivity.

Figure 11:
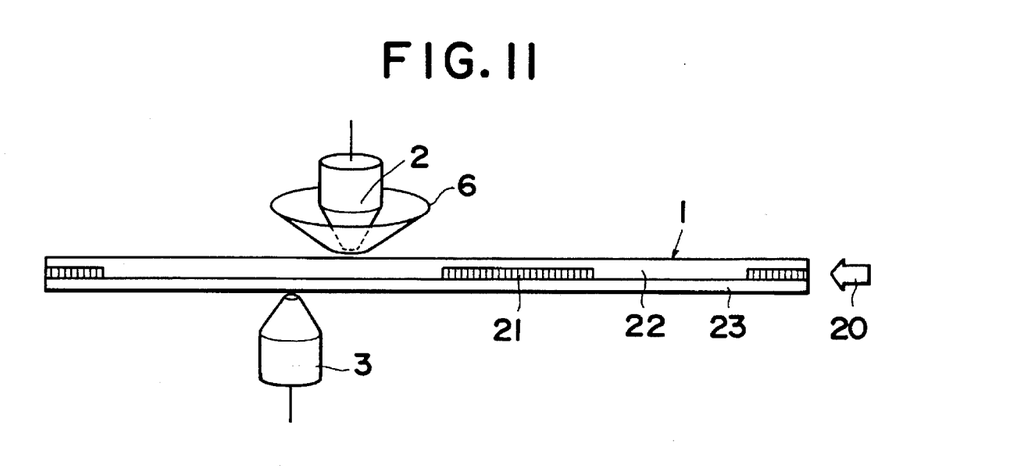

FIG. 11 shows an embodiment where a generator plate 2 is arranged on one side of an information member 1 and a detector plate 3 is arranged on the other side of the information member 1. A guard plate 6 having a conical form and having a hole in its lower portion, which works to limit a latent electrostatic coupling space, is arranged around the generator plate 2. The guard plate 6 may have a flat form with a hole. The detector plate 3 is preferably arranged a certain distance apart from a position located in the information member thickness direction directly below the generator plate 2. In this arrangement, good detection sensitivity can be always obtained even if the position of an electrically conductive film varies within a card in the thickness direction of the card.

Figure 12:
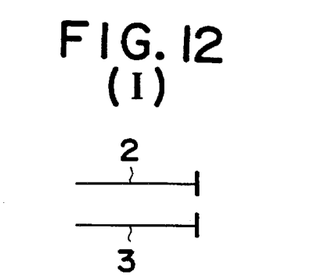
FIG. 12 is an illustration of operational principle of the third method of reading information.

FIG. 12 shows the principle for generation of electrostatic coupling. FIG. 12(I) shows a case where a condenser necessary for the electrostatic coupling is not formed. FIG. 12(II) shows a case where an electrically conductive film 21 forms a condenser together with a generator plate 2 and a detector plate 3.

Figure 13:
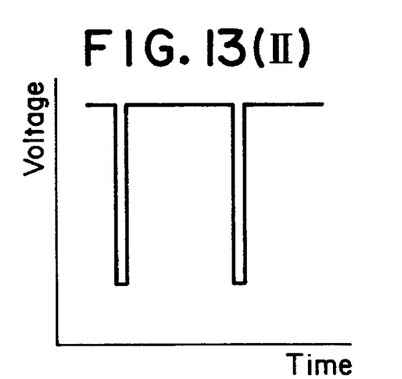
Figure 13I:
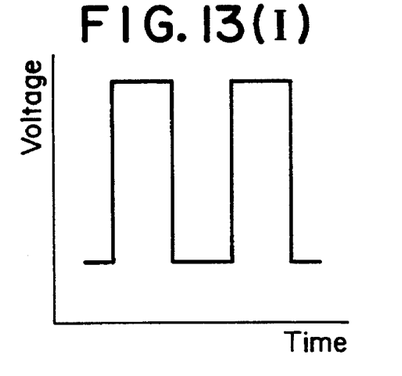
Figure 14:
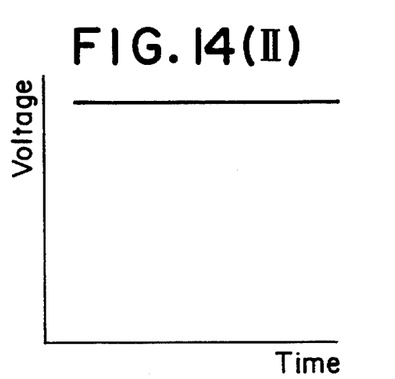
Figure 14I:
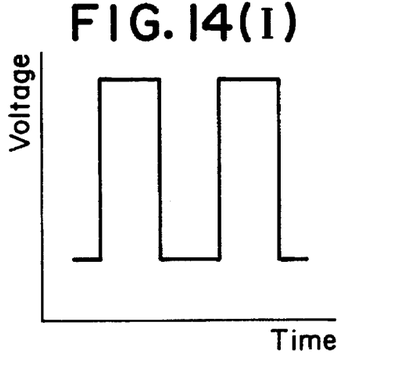

FIGS. 13 and 14 show results of measurement, with an oscilloscope, of an electrostatic shielding effect of the electrostatic coupling space in the apparatus shown in FIG. 2 according to the first method of reading information. FIG. 13(I) shows a pulse applied to the generator plate. FIG. 13(II) shows a waveform obtained after a signal detected with the detector plate without any electrically conductive film in the electrostatic coupling space is transmitted into a potential detecting circuit. FIG. 14 shows a waveform of a signal obtained from the potential detecting circuit when the electrically conductive film is present in the electrostatic coupling space shown in FIG. 12. FIG. 14(I) shows a signal applied to the generator plate, and FIG. 14(II) shows a waveform obtained from the detector plate. In FIG. 13, clear electrostatic coupling is observed, and in FIG. 14, there is observed an electrostatic shielding effect obtained due to the presence of an electrically conductive film in the electrostatic coupling space.

Figure 15:
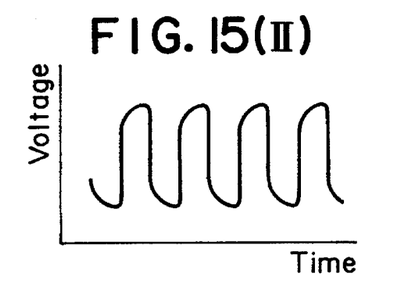
Figure 15I:
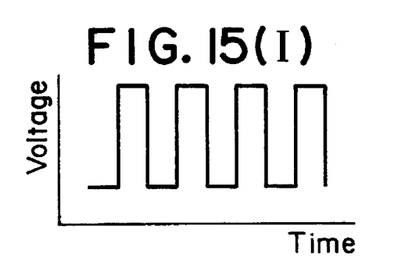
Figure 16:
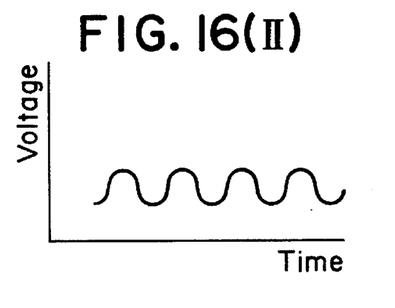

FIGS. 15 and 16 are graphs showing results of measurement, with an oscilloscope, of an electrostatic shielding effect in the latent electrostatic coupling space in the apparatus shown in FIG. 3 according to the second method of identifying information. FIG. 15(I) shows a pulse applied to the generator plate, and FIG. 15(II) shows a waveform obtained after a signal detected with the detector plate 3 without any electrically conductive film in the latent electrostatic coupling space is transmitted into the potential detecting circuit 9.

Figure 16I:
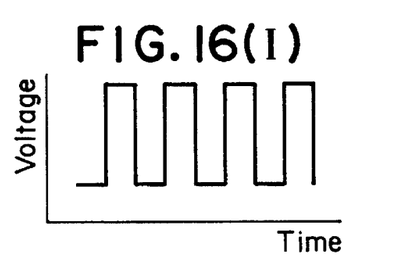

FIG. 16 shows a waveform obtained from the detector plate when the electrically conductive film having a grounded potential is positioned in the latent electrostatic coupling space in FIG. 15. FIG. 16(I) shows a signal applied to the generator plate, and FIG. 16(II) shows a waveform obtained from the detector plate. In FIG. 15, clear electrostatic coupling is observed, and in FIG. 16, there is observed an electrostatic shielding effect produced due to the presence of the electrically conductive film in the latent electrostatic coupling space.

Figure 17:
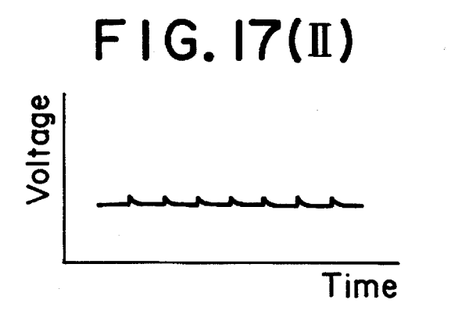
Figure 17I:
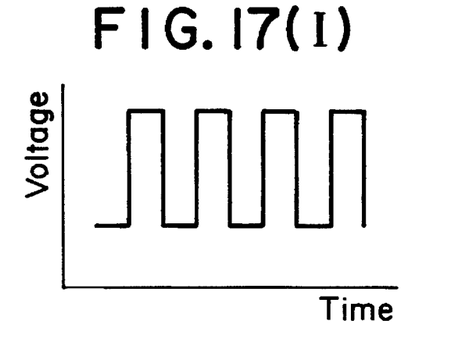
Figure 18:
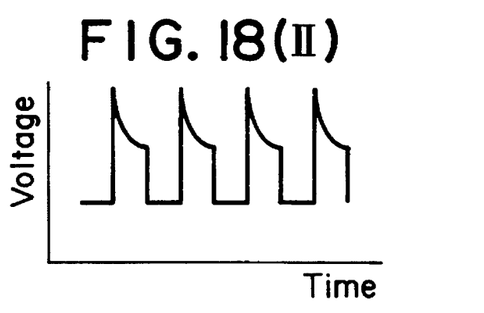
Figure 18I:
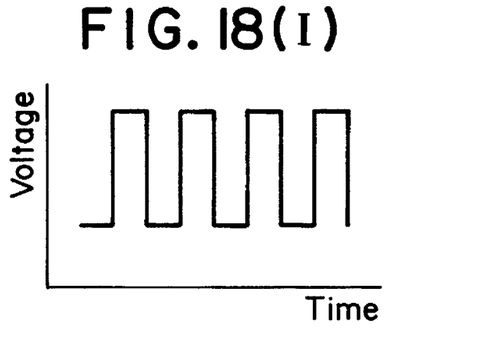

FIGS. 17 and 18 are graph showing results of measurement, with an oscilloscope, of an electrostatic induction effect in the latent electrostatic coupling space in the apparatus shown in FIG. 8 according to the third method of identifying information. FIG. 17(I) shows a pulse applied to the generator plate, and FIG. 17(II) shows a waveform detected after a signal detected with the detector plate 3 without any electrically conductive film in the latent electrostatic coupling space is transmitted into the potential detecting circuit 9. FIG. 18 shows a waveform of a signal obtained from the detector signal when the electrically conductive film is present in the latent electrostatic coupling space. FIG. 18(I) shows a signal applied to the generator plate, and FIG. 18(II) shows a waveform of a signal obtained from the detector plate. In FIG. 17, absence of electrostatic coupling is clearly observed, and in FIG. 18, there is observed an electrostatic induction effect produced due to the presence of the electrically conductive film in the latent electrostatic coupling space.

FIG. 19 shows one embodiment of the electrically conductive film having a form expressing information, suitable for use in the first and second methods of identifying information. An electrically conductive film 21 in FIG. 19 has a pattern of a bar code. It is preferable to stabilize a grounded potential of the electrically conductive film by electrically connecting its bars with an electrically conductive connection member 25, and connecting an electrostatically coupling member 26, which electrostatically couples with the grounding plate, to one end of the connection member 25 thereby to form an electrostatic coupling space between the coupling member and the grounding plate. However, addition of the above connection member and the coupling member is not necessarily required when each of the bars is electrically isolated and when those portions of the bars which are positioned outside the electrostatic coupling space or the latent electrostatic coupling space overlap the grounding plate areawise fully and form sufficient electrostatic coupling with the grounding plate.

Figure 20:
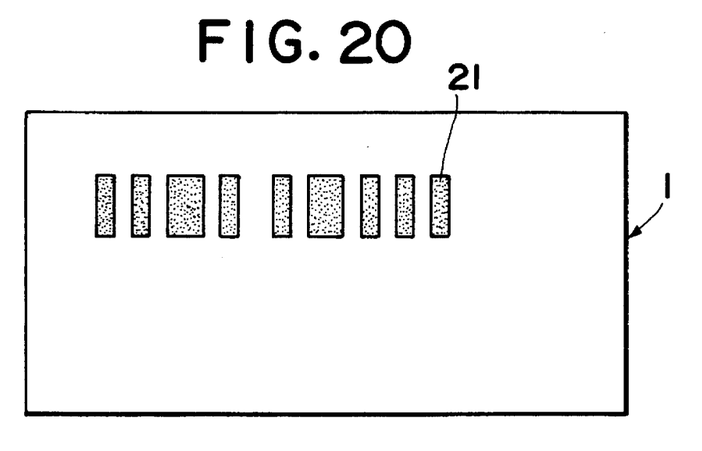
Figure 21:
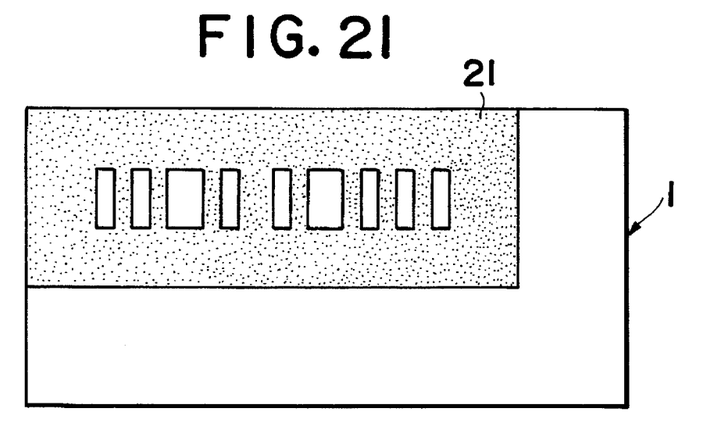

FIG. 20 shows one embodiment of the information member 1 which is a bar code having a positive pattern, and FIG. 21 shows one embodiment of the information member 1 which is a bar code having a negative pattern. The information provided to the pattern of this bar code comprises a bar width and an interbar distance. The width and the distance can be determined by multiplying a moving rate of the information member and the reciprocal of a frequency of a pulse to be detected and multiplying the resultant product and a count number of the pulse counted or not counted.

Figure 22:
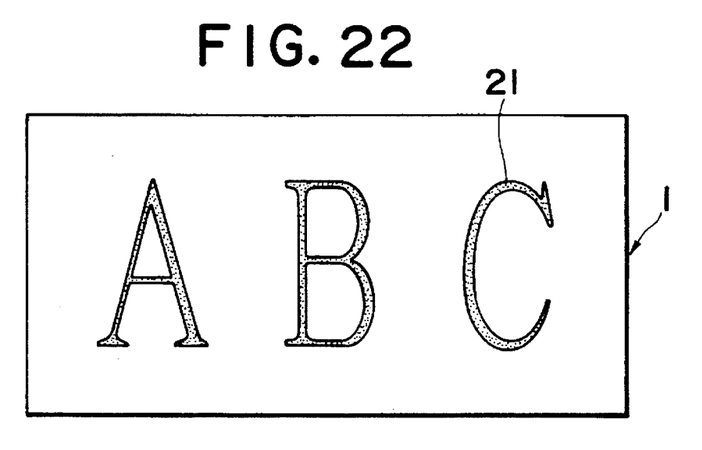

FIG. 22 shows information comprising letters, in which the information is identified as X-Y axial two-dimensional information. In this case, the information may be identified as two-dimensional one by identifying a unidirectional information in the X- or Y-axis direction and scanning it in the Y- or X-axis direction.

The information carrying member formed by covering an electrically conductive film having a form expressing information with an electrically nonconductive film will be explained hereinafter.

The electrically nonconductive material includes plastic, paper, and the like, which have been heretofore used for a card, securities, etc.

The electrically conductive film may be substantially concealed by coloring, naming, numbering and/or patterning the electrically nonconductive film with at least one means of a laminator, a printing machine, a thermal transfer printer, a sublimation transfer printer, a wire dot printer and an ink-jet printer.

Examples of the electrically conductive material are metals such as Ni, Fe, Pd, Cr, Ti, Cu, Ag, Au, Al, Zn, Co, etc., and alloys of these; oxides such as $SnO_2$, $In_2O_3$, CdO, ZnO, $Cd_2SO_4$, etc., and products prepared by doping these with Sb, F, Sn, W, Mo, or Al; monoxides such as $Cu_2S$, CdS, ZnS, $LaB_6$, TiN, TiC, ZrN, $ZrB_2$, HfN, etc.; an electrically conductive carbon, graphite, and the like.

In order to conceal the electrically conductive film to a greater extent by providing a design, a pattern, a symbol or the like thereon, it is preferable to use an electrically conductive film having high clearness and a low density. When it has a high density, it may be rendered invisible by providing a white concealing layer.

When the electrically conductive film is produced so as to have a form expressing information, i.e. formed into a variety of patterns, conventionally known methods can be employed therefor. For example, the electrically conductive film can be formed by an evaporation method, a chemical plating method, an electroplating method, a method of applying or printing an electrically conductive coating composition, a method of attaching a metal foil, applying a photosensitive material, baking a pattern and then dissolving an unnecessary portion to remove it, a method of attaching a metal foil and then etching or applying a laser to the metal foil to form a pattern, or the like. Further, as a simpler method, a pattern may be formed by using a thermal transfer ribbon using an electrically conductive thermal ink by means of a thermal head, and the like.

The electrically conductive pattern after formed may be covered or concealed with an electrically nonconductive material by various known methods, e.g., by attaching an electrically nonconductive material having an adhesive applied to one of its surfaces, by applying a thermoplastic resin to the electrically conductive pattern and subjecting it to a heat roll, by applying an electrically nonconductive ink by means of a printing machine, or by some other method. Further, the electrically nonconductive film may be formed by using a thermal transfer ribbon using an electrically conductive thermal ink.

According to the method of reading information, provided by this invention, it is possible to use an information carrying member formed, in a sandwich structure, of an electrically conductive member in which various pieces of information are stored and an electrically nonconductive material covering or concealing the electrically conductive member. Therefore, the information can be easily rendered invisible. And, the information carrying member of this invention is only required to have an electrically conductive member having a pattern and an electrically nonconductive material. Therefore, the information carrying member has high resistance to environmental change, and the method of this invention has an advantage that the pattern therefor can be formed by a variety of methods such as a thermal transfer method, and the like.

According to the method of identifying reading information, provided by this invention, individual information can be recorded and identified at a real time. And, the method of this invention has an advantage that it can be also employed as means of providing constant information when a pattern is formed by a printing method, etc.

According to the method of identifying reading information, provided by this invention, since the information reading portion is structurally only required to have the generator plate, the detector plate and, optionally, the guard plate, these plates can be easily arranged unidimensionally or two-dimensionally. Further, the method of this invention therefore has an advantage that two-dimensional information can be easily identified by moving the electrically conductive member unidimensionally or by fixing it.

According to the method of identifying information, provided by this invention, the method of this invention can be applied to a unidimensional, two-dimensional or fixed information identifying method by combining it with other identifying method. And, the method of this invention has an advantage that it can be automatized easily.

According to the method of identifying information, provided by this invention, means of providing the electrically conductive member with information is simple and less expensive. For example, the method of this invention has an advantage that a conventional bar code printer can be used as it is when an electrically conductive thermal transfer sheet is used.

EXAMPLES

The method of identifying information, provided by this invention, is explained below by reference to Examples in which information members having an electrically conductive film expressing information are prepared by mainly using a thermal transfer ribbon. In Examples, "part" stands for "part by weight".

Ink Composition A

A coating liquid having the following composition was dispersed with an attriter at room temperature to give an ink for a peel layer.

| | |
|---|---|
| White pigment (titanium oxide) | 20 parts |
| Carnauba wax | 1 part |
| Polyvinyl butyral ("#3300-1" supplied by Denki Kagaku Kogyo K.K.) | 3 parts |
| Isopropyl alcohol | 76 parts |

Ink Composition B

A coating liquid having the following composition was dissolved by means of a DISPER at room temperature to give an ink for a levelling layer.

| | |
|---|---|
| Styrene acrylic resin ("MH7025") supplied by Fujikura Kasei K.K.) | 10 parts |
| Toluene | 70 parts |
| Methyl isobutyl ketone | 20 parts |

Ink Composition C

A coating liquid having the following composition was dispersed with an attriter at room temperature to give an ink for an electrically conductive ink layer.

| | |
|---|---|
| Electrically conductive carbon ("Seast SO") supplied by Tokai Carbon K.K.) | 20 parts |
| Petroleum resin ("ARKON M70") supplied by Arakawa Kagaku K.K.) | 20 parts |
| Toluene | 60 parts |

Ink Composition D

A coating liquid having the following composition was dispersed with an attriter at room temperature to give an ink for an overcoat layer.

| | |
|---|---|
| Polyamide resin ("DPX-640" supplied by Henkel) | 20 parts |
| Carnauba wax | 1 part |
| Toluene | 69 parts |
| Isopropyl alcohol | 10 parts |

Ink Composition E

A coating liquid having the following composition was dispersed with an attriter at room temperature to give an ink for a concealing layer.

| | |
|---|---|
| Polyamide resin ("DPX-640" supplied by Henkel) | 10 parts |
| Carnauba wax | 1 part |
| Titanium oxide | 60 parts |
| Toluene | 20 parts |
| Isopropyl alcohol | 9 parts |

The following thermal transfer ribbons were prepared from the above ink compositions A to E. These ink compositions were all applied by a gravure coating method in an amount specified below. Polyethylene terephthalate films having a thickness of 6 μm were used as a substrate.

Thermal Transfer Ribbon 1

0.3 g/m² of the ink A was applied to a substrate, and 1.0 g/m² of the ink B was applied thereon. Aluminum was evaporated thereon to form an electrically conductive film having a thickness of 100 Å, and then, 1.2 g/m² of the ink D was applied to give a thermal transfer ribbon.

Thermal Transfer Ribbon 2

1.0 g/m² of the ink B was applied to a substrate, and aluminum was evaporated thereon to form an electrically conductive film having a thickness of 100 Å. Then, 1.2 g/m² of the ink D was applied thereon to give a thermal transfer ribbon.

Thermal Transfer Ribbon 3

0.3 g/m² of the ink A was applied to a substrate, and then, 0.5 g/m² of the ink C was applied thereon to give a thermal transfer ribbon.

Thermal Transfer Ribbon 4

0.4 g/m² of the ink C was applied to a substrate, and then, 0.5 g/m² of the ink D was applied thereon to give a thermal transfer ribbon.

Thermal Transfer Ribbon 5

3.0 g/m² of the ink E was applied to a substrate to give a thermal transfer ribbon.

Information members were prepared by using the above thermal transfer ribbons.

Information patterns A to D indicated in Table 1 are as follows.

Pattern A: The pattern was formed as shown in FIG. 19. The pattern, however, was without a member for formation of an electrostatic coupling space.

Pattern B: The pattern was a positive pattern formed as shown in FIG. 20.

Pattern C: The pattern was a negative pattern formed as shown in FIG. 21.

Pattern D: The pattern was formed as shown in FIG. 22.

Method of Forming Patterns:

a. Bar code patterns were printed with a bar code printer (B-30-S-1, supplied by Tokyo Denki K.K.).

b. Connection members and the negative pattern were printed with a printer ("CopiLman FN-P300" using a thermal transfer method, supplied by Matsushita Electric Industrial Co., Ltd.).

The detection sensitivity was measured by using an apparatus shown in FIG. 2.

Table 1 shows Examples 1 to 8.

TABLE 1

| | Examples | | | | | | | |
|---|---|---|---|---|---|---|---|---|
| | 1 | 2 | 3 | 4 | 5 | 6 | 7 | 8 |
| Thermal transfer ribbon | | | | | | | | |
| 1 | ○ | — | — | — | ○ | — | ○ | ○ |
| 2 | — | ○ | — | — | — | ○ | — | — |
| 3 | — | — | ○ | — | — | — | — | — |
| 4 | — | — | — | ○ | — | — | — | — |
| 5 | — | — | — | — | ○ | ○ | ○ | ○ |
| Pattern | A | A | A | A | B | C | C | D |
| Detection sensitity | ○ | ○ | ○ | ○ | ○ | ⊙ | ⊙ | ○ |

The detection sensitivity was rated as follows.
○: Readable stably.
⊙: Readable very stably.

In Example 1, a peel layer containing the white pigment was present on an evaporated layer after the transfer, whereby a white bar code pattern was obtained.

In Example 2, a bar code pattern having metallic gloss was obtained.

In Example 3, a peel layer containing the white pigment was present on a layer containing the electrically conductive carbon after the transfer, whereby a grayish white bar code pattern was obtained.

In Example 4, a black bar code pattern was obtained.

In Examples 5 to 8, a white concealing layer formed from the thermal transfer ribbon 5 was positioned on an electrically conductive pattern formed from the thermal transfer ribbon 1 or 2, and the electrically conductive pattern was rendered invisible. In addition, in Example 7, characters were printed by further using a usual thermal transfer ribbon, and in Example 8, a design was formed further by offset printing.

What is claimed is:

1. A method of detecting an electrically conductive pattern contained in an information carrying member, the conductive pattern representative of predetermined information and being covered by an electrically non-conductive material, said method comprising the steps of:

forming an electrostatic coupling space by applying a voltage to an electric field generating device to generate an electric field extending from the electric field generating device to an electric field detecting device;

passing the information carrying member through said electrostatic coupling space;

electrostatically grounding the conductive pattern of the information carrying member while the information carrying member is passed through said electrostatic coupling space;

detecting a change in the electric field from an ON state of an OFF state, using said electric field detecting device, while the information carrying member is passed through said electrostatic coupling space; and, discriminating a presence of said conductive pattern within said electrostatic coupling space in response to a detected change in said electric field from said ON state to said OFF state;

wherein said electric field extending from said electric field generating device to said electric field detecting device becomes said OFF state when said electric field is cut off by an electrostatic screening effect when said conductive pattern is electrostatically grounded and located within said electrostatic coupling space.

2. A method according to claim 1, wherein the information carrying member further includes a common electrically conductive plate member electrically coupled to said conductive pattern.

3. A method according to claim 2, wherein said electrostatically grounding step includes electrostatically coupling said common electrically conductive plate with a grounding plate.

4. A method according to claim 1, wherein said electrostatically grounding step includes positioning said information carrying member in parallel with and contiguous to a grounding plate.

5. A method according to claim 1, further comprising providing a guard plate in association with at least one of said electric field generating device and said electric field detecting device to control formation of said electrostatic coupling space.

6. A method of detecting an electrically conductive pattern contained in an information carrying member, the conductive pattern representative of predetermined information and being covered by an electrically non-conductive material, said method comprising the steps of:

forming a latent electrostatic coupling space by applying a voltage to an electric field generating device to generate an electric field extending from the electric field generating device to an electric field detecting device;

passing the information carrying member through said latent electrostatic coupling space;

electrostatically grounding the conductive pattern of the information carrying member while the information carrying member is passed through said latent electrostatic coupling space;

detecting a change in the electric field, using said electric field detecting device, while the information carrying member is passed through said latent electrostatic coupling space; and, discriminating a presence of said conductive pattern within said latent electrostatic coupling space according to a detected change in said electric field;

wherein said electric field extending from said electric field generating device to said electric field detecting device is cut off by an electrostatic screening effect when said conductive pattern is electrostatically grounded and located within said latent electrostatic coupling space;

wherein said electric field generating device and said electric field detecting device are entirely located on a same side of the information carrying member during said passing step;

wherein said electrostatically grounding step includes positioning said information carrying member in parallel with and contiguous to a grounding plate; and wherein said method further comprises providing a guard plate surrounding said electric field generating device and said electric field detecting device, said guard plate having an edge defining an opening therein, and connecting said grounding plate to said edge of said guard plate such that said grounding plate does not cover said opening, and wherein said passing step includes moving the information carrier relative to said electric field generating device and said electric field detecting device so as to pass the opening of said guard plate along said information carrying member.

7. A method of detecting an electrically conductive pattern contained in an information carrying member, the conductive pattern representative of predetermined information and being covered by an electrically non-conductive material, said method comprising the steps of:

forming a latent electrostatic coupling space by applying a voltage to an electric field generating device to generate an electric field extending from the electric field generating device to an electric field detecting device;

passing the information carrying member through said latent electrostatic coupling space;

electrostatically grounding the conductive pattern of the information carrying member while the information carrying member is passed through said latent electrostatic coupling space;

detecting a change in the electric field, using said electric field detecting device, while the information carrying member is passed through said latent electrostatic coupling space; and, discriminating a presence of said conductive pattern within said latent electrostatic coupling space according to a detected change in said electric field;

wherein said electric field extending from said electric field generating device to said electric field detecting device is cut off by an electrostatic screening effect when said conductive pattern is electrostatically grounded and located within said latent electrostatic coupling space;

wherein said electric field generating device and said electric field detecting device are entirely located on a same side of the information carrying member during said passing step;

wherein said electrostatically grounding step includes positioning said information carrying member in parallel with and contiguous to a grounding plate; and wherein said method further comprises providing said electric field detecting device so as to surround said electric field generating device, and providing said guard plate as first and second guard plates, the first guard plate being provided so as to surround the electric field detecting device, and the second guard plate being provided partially interposed between the electric field detecting device and the electric field generating device.

* * * * *